(12) United States Patent
Azim

(10) Patent No.: US 9,197,759 B2
(45) Date of Patent: Nov. 24, 2015

(54) SYSTEM AND PROCESS FOR TRACKING AND EXCHANGING CONSUMER PURCHASES FOR COMMUNICATION SERVICES

(71) Applicant: Malik Azim, Oakland, CA (US)

(72) Inventor: Malik Azim, Oakland, CA (US)

(*) Notice: Subject to any disclaimer, the term of this patent is extended or adjusted under 35 U.S.C. 154(b) by 148 days.

(21) Appl. No.: 14/038,426

(22) Filed: Sep. 26, 2013

(65) Prior Publication Data

US 2014/0087689 A1     Mar. 27, 2014

Related U.S. Application Data

(60) Provisional application No. 61/706,601, filed on Sep. 27, 2012.

(51) Int. Cl.
*H04M 11/00* (2006.01)
*H04M 15/00* (2006.01)
*G06Q 30/02* (2012.01)

(52) U.S. Cl.
CPC ........... *H04M 15/68* (2013.01); *G06Q 30/0207* (2013.01); *H04M 2215/0192* (2013.01)

(58) Field of Classification Search
CPC ....... H04W 4/00; H04W 4/001; H04W 4/003; H04W 4/02; H04W 4/24; H04W 4/26; H04M 3/248; H04M 2215/32
USPC .............................. 455/406–409, 432.3, 433
See application file for complete search history.

(56) References Cited

U.S. PATENT DOCUMENTS

| | | | |
|---|---|---|---|
| 7,986,935 B1 * | 7/2011 | D'Souza et al. | 455/406 |
| 2010/0185534 A1 * | 7/2010 | Satyavolu et al. | 705/30 |
| 2011/0246292 A1 * | 10/2011 | Satyavolu et al. | 705/14.49 |
| 2013/0173387 A1 * | 7/2013 | Adelaar | 705/14.53 |
| 2013/0179316 A1 * | 7/2013 | Ross | 705/35 |

* cited by examiner

*Primary Examiner* — San Htun
(74) *Attorney, Agent, or Firm* — Plager Schack LLP

(57) ABSTRACT

Some embodiments provide a novel system and process for tracking purchases of a consumer in exchange for communication service. In some embodiments, the communication service comprises a cell phone service plan. In some embodiments, the communication service comprises a reduced-price service plan. In some embodiments, the reduced-price service plan is a free service plan.

11 Claims, 6 Drawing Sheets

SYSTEM AND PROCESS FOR TRACKING AND EXCHANGING CONSUMER PURCHASES FOR COMMUNICATION SERVICES

CLAIM OF BENEFIT TO PRIOR APPLICATION

This application claims benefit to U.S. Provisional Patent Application 61/706,601, entitled "RAC Tones offers free telephone service for consumers in exchange for receiving advertisements from companies," filed Sep. 27, 2012. The U.S. Provisional Patent Application 61/706,601 is incorporated herein by reference.

BACKGROUND

The embodiments herein relate generally to consumer purchase tracking, and in particular to tracking consumer purchases in exchange for communication services.

A typical person with a cell phone pays a monthly fee to a cell phone service provider for a level of service. For example, the person might pay fifty dollars per month for a particular number of allocated minutes that the person can use during the month. Most people with cell phones would like to obtain free or reduced price cell phone service. To date, .currently existing loyalty programs offer incentives that are exclusive to specific vendors and/or products and are widely used by consumers who wish to save money and/or obtain the loyalty program benefits. However, no cell phone service loyalty program or other program exists that can provide benefits to consumers in the form of free or reduced-price cell phone service. Since most consumers with cell phones are also consumers of other products that are associated with loyalty programs (i.e., clothes, travel, groceries, gas, etc.), many consumers would like a way to leverage their purchases of such products in order to obtain free or reduced-price cell phone service.

Therefore, what is needed is a mechanism for providing incentives to consumers to purchase items which can be tracked in exchange for free and/or reduced-price cell phone service.

BRIEF SUMMARY

Some embodiments of the invention provide a novel system and process for tracking purchases of a consumer in exchange for communication service. In some embodiments, the communication service comprises a cell phone service plan. In some embodiments, the communication service comprises a reduced-price service plan. In some embodiments, the reduced-price service plan is a free service plan.

The process in some embodiments comprises tracking purchases of a consumer and exchanging communication service based on the tracked purchases. In some embodiments, the process further comprises setting a minimum spending threshold for the purchases. The minimum spending threshold for the purchases is a required amount of spending for a defined time period in order for the communication service to be exchanged. The defined time period can be any pre-defined period of time. In some embodiments, the pre-defined period of time is the billing time period defined by the consumer's cell phone service provider.

The system in some embodiments comprises a code capture device for scanning an encoded symbol associated with an item for purchase and a computing device for running a software application that determines whether a consumer has satisfied the minimum spending threshold. In some embodiments, the code capture device is a scanner. In some embodiments, the encoded symbol comprises one of a bar code and a QR code.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description, several examples and embodiments of the invention are described. However, it will be clear to a person skilled in the art that the invention is not limited to the embodiments set forth and can be adapted for any of several other uses.

As stated above, a typical person with a cell phone pays a monthly fee to a cell phone service provider for a level of service. Yet, most people with cell phones would like to obtain free or reduced price cell phone service. However, most people cannot find any way to obtain free service. Although currently existing loyalty programs offer incentives that are exclusive to specific vendors and/or products and are widely used by consumers who wish to save money and/or obtain the loyalty program benefits, no cell phone service loyalty program or other program exists that can provide benefits to consumers in the form of free or reduced-price cell phone service. Thus, since most consumers with cell phones are also consumers of other products that are associated with loyalty programs (i.e., clothes, travel, groceries, gas, etc.), many consumers would like a way to leverage their purchases of such products in order to obtain free or reduced-price cell phone service. Embodiments of the invention described in this specification solve this issues.

Some embodiments of the invention which provide a novel system and a novel process for exchanging tracked purchases of a consumer for communication service. In some embodiments, the communication service is a cell phone service plan. In some embodiments, the communication service is a reduced-price service plan. In some embodiments, the reduced-price service plan is a free service plan.

By way of example, FIGS. 1-5 demonstrate a consumer, a service provider, and a vendor using an example system that exchanges tracked consumer purchases for cell phone service. In particular, each figure demonstrates one phase of using the system. Furthermore, FIGS. 1-5 demonstrate one example sequence in which the phases for using the system are performed by the consumer, the service provider, and the vendor. In some embodiments, a different sequence of the phases for using the system is possible.

Figure 1:
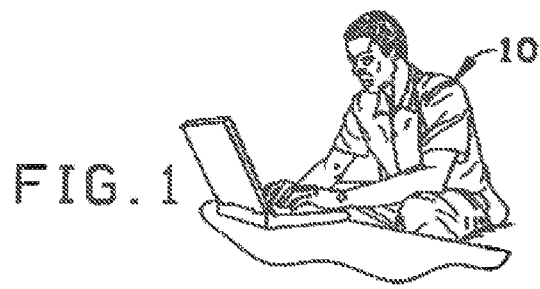
FIG. 1 conceptually illustrates a view that demonstrates a user website registration phase in some embodiments.

FIG. 1 conceptually illustrates a view that demonstrates a user website registration phase in some embodiments. In this figure, a consumer 10 performs user input operations at a computing device that is running a web browser to access the registration website over the Internet. The website can be associated with a particular cell phone service provider. In some embodiments, the consumer designates a vendor or retailer in which the registration will be applied to the purchases made. For example, the consumer may register with the system at a website of a cellular service provider and may indicate a particular retail store in which to track purchases.

Instead of accessing a website to register, in some embodiments, the consumer performs user input to complete a registration process through a client software application associated with the system and which is connected to a server software application associated with the system for exchanging tracked purchases for cell phone service. In these embodiments, the registration process can be performed over another network, such as a LAN, a WAN, or another such network.

Figure 2:
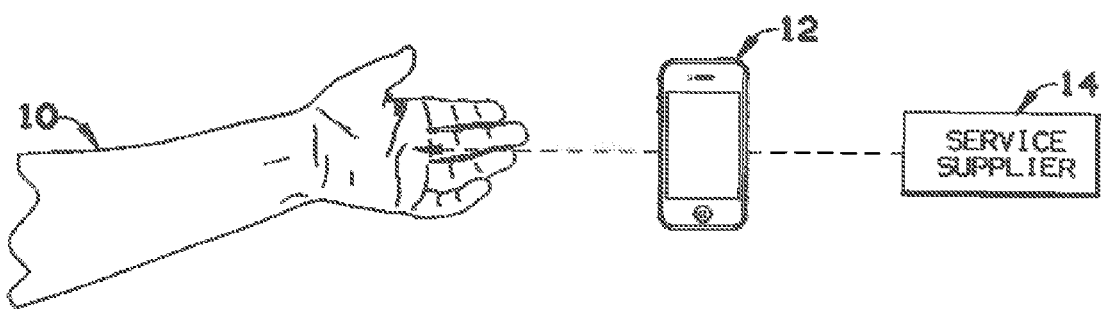
FIG. 2 conceptually illustrates a schematic view that demonstrates a cellular communication device supply phase in some embodiments.

Regardless of the manner in which the consumer is able to register with the system, after registration is complete, after registration is complete, the cellular service provider in some embodiments provides a branded cell phone for the consumer to use which is associated with the designated retailer. FIG. 2 conceptually illustrates a schematic view that demonstrates a cellular communication device supply phase in some embodiments. As shown in this figure, the consumer 10 has a cellular communication device 12 that is associated with a particular cell phone service provider 14 (i.e., a branded cell phone). The branded cell phone in these embodiments arrives pre-enrolled in a service plan that offers free or reduced-price cellular service, depending one or more registration process selections. In some embodiments, the consumer is required to pay for cellular service if purchase amounts do not satisfy a threshold for a defined period (e.g., each month).

Figure 3:
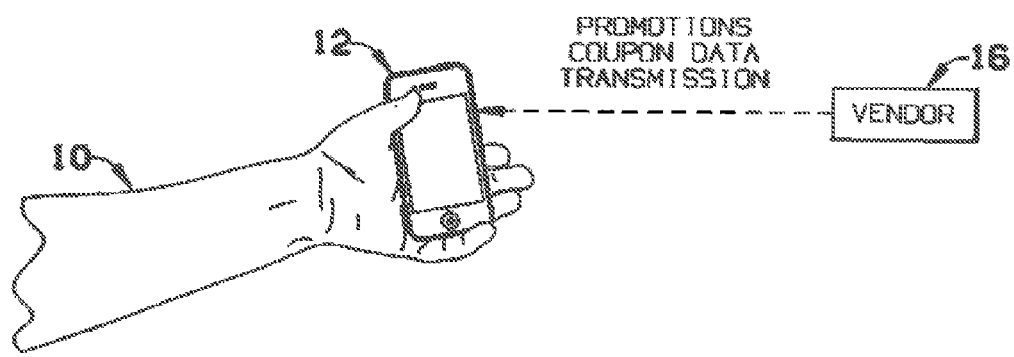
FIG. 3 conceptually illustrates a schematic view which in some embodiments demonstrates a vendor promotions/coupon transmission phase.

FIG. 3 conceptually illustrates a schematic view which in some embodiments demonstrates a vendor promotions/coupon transmission phase. As shown in this figure, a vendor 16 supplies promotional coupon data to the cellular communication device of the consumer. In some embodiments, once the branded cell phone is activated by the consumer, the retailer can begin sending promotions and coupons to the branded cell phone of the consumer. In some embodiments, the retailer can allow other retailers to send promotions and coupons to the branded cell phone of the consumer. For example, the consumer may have registered with Big Box Retailer, Inc., and received a branded cell phone from the service provider, and after the branded cell phone is activated, Big Box Retailer may send promotions and coupons or may contract with Long Tape Retailer, Inc., to allow Long Tape Retailer to send coupons and/or promotions to the branded cell phone of the consumer. Thus, although the example shown in FIG. 3 illustrates a single vendor 16, in some cases, the vendor 16 includes multiple retailers or vendors, including at least the branding vendor associated with the branding of the cell phone provided to the consumer and one or more other vendors permitted to send coupons and promotion data to the branded cell phone of the consumer.

Figure 4:
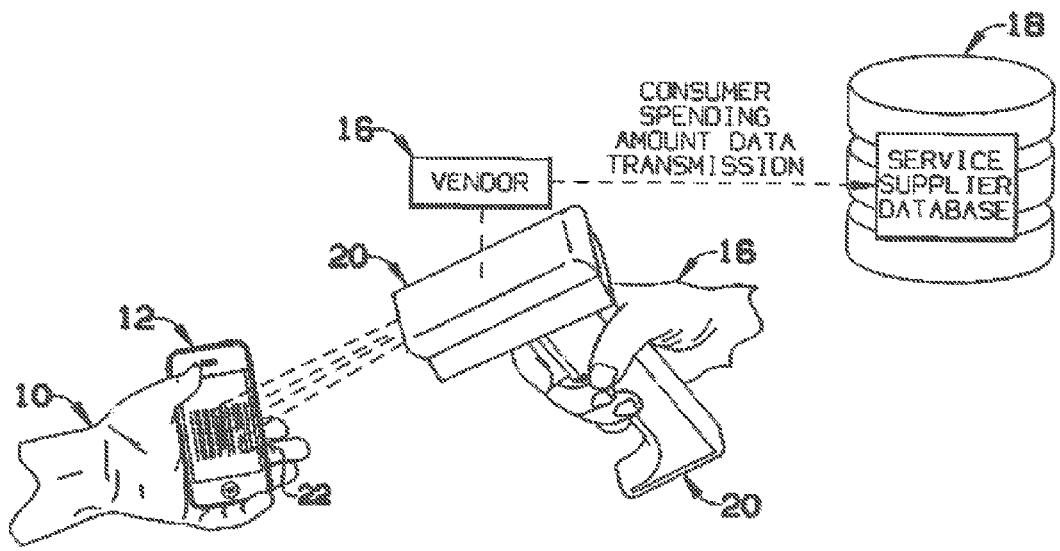
FIG. 4 conceptually illustrates a schematic view which in some embodiments demonstrates a scan phase.

The system can start to track purchases of the consumer when the consumer 10 actually buys merchandise, products, services, or other items from the vendor 16. FIG. 4 conceptually illustrates a schematic view that demonstrates a scan phase of a system for exchanging tracked purchases for cell phone service in some embodiments. As shown in this figure, the consumer holds the branded cell phone 12 in front of a scanning device 20 that an agent of the vendor 16 operates. In some embodiments, the branded cell phone 12 displays an encoded symbol 22 on a display screen of the cell phone so that the scanner 20 is able to scan and read the encoded symbol 22. In some embodiments, the encoded symbol 22 is one of a bar code, a QR code, and another type of product encoding. In some embodiments, the consumer 10 uses the branded cell phone 12 to obtain an image of the encoded symbol 22. For example, the consumer is on the premises of vendor's store and takes a picture or scans an encoded symbol 22 on a price tag associated with a particular product in vendor's store. Alternatively, the consumer downloads the encoded symbol from a website that provides a virtual checkout of products in a basket (i.e., shopping online). After the encoded product symbol is scanned by the scanning device 20, a purchase amount associated with the scanned encoded symbol 22 is transmitted to a database 18 that stores consumer purchase information.

After the consumer has shopped at the retailer, a purchase amount will be available from the database 18. In some cases, the system provides free or reduced-price cellular service to the consumer based on the amount of purchases. If the amount of purchases satisfies a threshold minimum amount, then the consumer 10 obtains the cell service free or at a reduced price.

Figure 5:
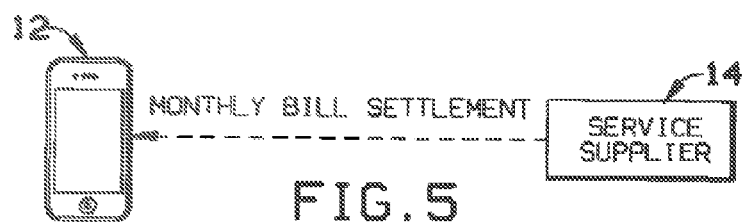
FIG. 5 conceptually illustrates a schematic view of a bill settlement phase in some embodiments.

FIG. 5 conceptually illustrates a schematic view of a bill settlement phase in some embodiments. As shown in this figure, the monthly bill settlement amount is transmitted to the branded cell phone 12 by the service provider 14. In some embodiments, if the consumer has satisfied the threshold purchase amount, the consumer is provided free service and the bill settlement is only a perfunctory transmission of data. In some embodiments, the threshold spending amount may have been satisfied, but the bill settlement data indicates a reduced-price obligation that the consumer must pay to retain service. In some embodiments, if the threshold amount was not satisfied, then the bill settlement amount is the normal rate for the service. For example, the rate provided for by a contract defining the service rates.

Several more detailed embodiments are described in the sections below. Section I describes a process for a buyer to create an RFI and interact anonymously with one or more vendors in relation to a buying project. Section II describes a process for a vendor to participate in a buying project created by an anonymous buyer. Next, Section III describes an electronic system that implements some of the embodiments of the invention.

I. Process to Track Purchases and Exchange Cell Phone Service

The process for exchanging tracked purchases for cell phone service in some embodiments comprises tracking purchases of a consumer and exchanging communication service based on the tracked purchases. In some embodiments, the process further comprises setting a minimum spending threshold for the purchases. The minimum spending threshold for the purchases is a required amount of spending for a defined time period in order for the communication service to be exchanged. The defined time period can be any pre-defined period of time. In some embodiments, the pre-defined period of time is the billing time period defined by the consumer's cell phone service provider.

Figure 6:
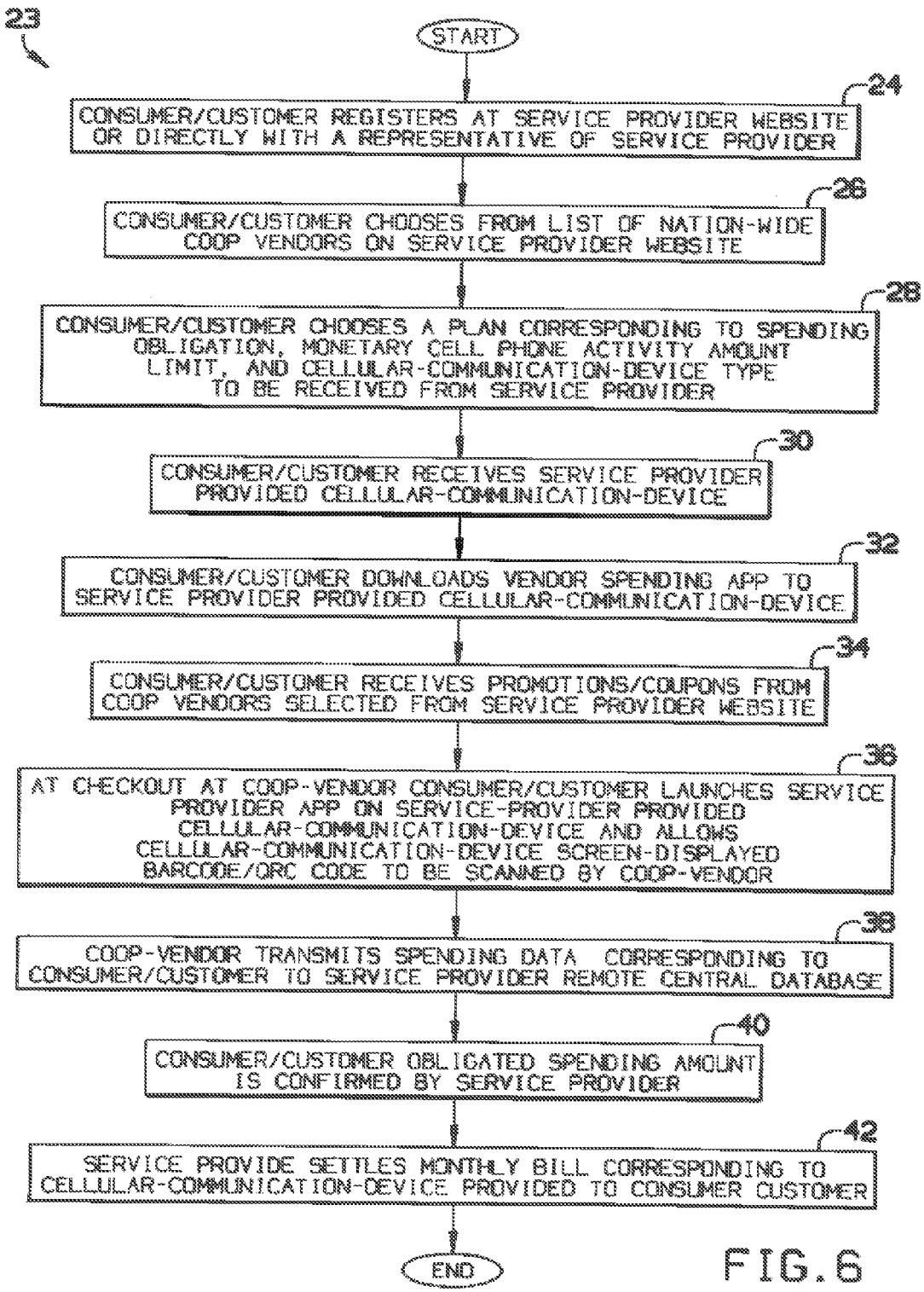
FIG. 6 conceptually illustrates a process in some embodiments for tracking and exchanging purchases for cell phone service.

FIG. 6 conceptually illustrates a process in some embodiments for tracking and exchanging purchases for cell phone service. The process 23 begins at the registration phase, which is described above by reference to FIG. 1. In some embodiments, the process is performed by web server application that hosts a website for registering for service with a cell phone service provider. The process of some embodiments receives (at 24) a request for consumer registration. The process thereafter receives (at 26) a selection of a coop vendor. In some embodiments, the consumer chooses the coop vendor from a list of nationwide coop vendors that are displayed in a list on the website of the service provider and are accessible to the consumer to make a selection. The process then receives (at 28) selection of a plan corresponding to a set of parameters that define the level of service the consumer will receive from the service provider. In some embodiments, the set of parameters comprise a threshold spending amount, a cell phone service amount to provide at reduced-price or free, and a cellular communication device. In some embodiments, other parameter data is required to complete registration. In some embodiments, the website of the service provider is the same website the consumer accesses to provide user input to complete the registration phase. In other embodiments, the cell phone service provider receives the registration information and passes it on to the process 23 to complete registration.

After registration, the process proceeds to 30 where the consumer receives the cellular communication device. In some embodiments, the process 23 establishes a delivery method and tracks an inventory database to decrement one cell phone from an amount of cell phones associated with the user-selected type of cell phone. Next, the process provides (at 32) a vendor spending app to the branded cell phone. In some embodiments, the branded cell phone automatically downloads and installs the app upon activation of the branded cell phone. After the app is running, the process transmits (at 34) promotions and coupons to the branded cell phone. In some embodiments, the promotions and coupons are associated with the selected coop vendor. In other embodiments, other vendors provide promotions and coupons based on an existing contract with the selected coop vendor to provide such promotions and coupons.

At some point in time, the consumer will go shopping at a store or online website of the coop vendor. When that occurs, the process 23 launches (at 36) the app on the branded cell phone to allow product encoded symbols to be scanned at checkout. After scanning the encoded symbol of each product the consumer is buying, the process then transmits (at 38) a set of checkout spending data to the server for processing and storing in the database.

After a defined period of time (i.e., a monthly billing cycle), the process calculates (at 40) the total amount of purchases for the period of time. For example, the process adds all of the purchase prices together to determine the total amount of spending for the month. In some embodiments, the process compares the total amount with the minimum threshold amount required to be purchased. The process 23 then settles (at 42) the monthly bill amount based on the amount of purchases for the month in light of the minimum threshold spending amount. After this, the process 23 ends. Thus, the process is able to provide free or reduced-price cell phone service to a consumer simply based on purchase amounts made by a consumer registered at a particular retailer. Like a consumer loyalty card in traditional retail scenarios, the process 23 provides a benefit to the consumer and the vendor. In addition, the process provides a benefit to the service provider.

II. Systems to Track Purchases and Exchange Cell Phone Service

In some embodiments, a system that tracks purchases and exchanges cell phone service for satisfying a defined purchase level comprises (i) a code capture device for scanning an encoded symbol associated with an item for purchase and (ii) a computing device for running a software application that determines whether a consumer has satisfied the minimum spending threshold. In some embodiments, the code capture device is a scanner. In some embodiments, the encoded symbol comprises one of a bar code and a QR code.

Figure 7:
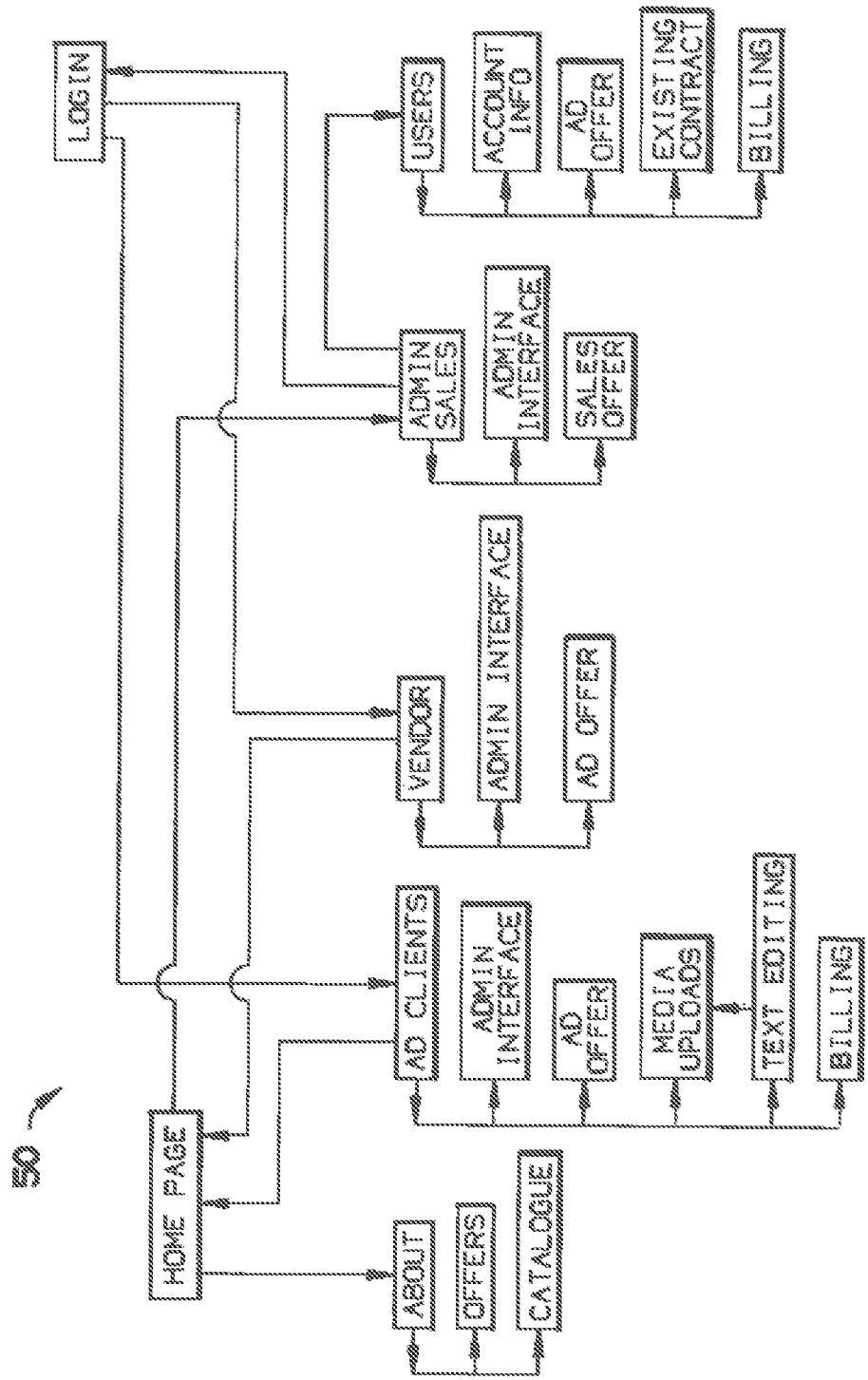
FIG. 7 conceptually illustrates a schematic view of a system that tracks and exchanges purchases for cell phone service through a website in some embodiments.

By way of example, FIG. 7 conceptually illustrates a schematic view of a system that tracks and exchanges purchases for cell phone service through a website in some embodiments. As shown in this figure, the system 50 comprises a home page, a login page, and a plurality of other pages that allow the website to be used for account management after the consumer has registered. In some embodiments, the website system 50 performs operations of the process 23 via one or more of the website pages shown in this figure.

The system 50 includes several web pages that relate only tangentially to the overall novel aspects of some embodiments. All systems that exchange tracked purchase for cell service, however, must be able to capture receipts associated with a consumer's spending, doing so by scanning an encoded symbol (e.g., QR code, bar code, etc.) displayed on a price tag or on a display screen of the branded cell phone. Furthermore, all systems must be able to verify and validate contracted spending limits. For example, the systems can just retrieve contract spending requirement from the database and compare to overall spending amounts for a defined period. Finally, all systems must be able to apply incentive credits to the billing statement provided to consumer, with adjustments to the amount owed made based on whether or not the consumer has satisfied the threshold spending amounts required under the service plan.

In this way, the system 50 offers rewards in the form of smart phone and/or cell phone expense credits. As a person skilled in the art would appreciate, the example systems and processes are described to exemplify, and not limit, some embodiments of the invention, and thus, a person skilled in the art understands that other manners of performing the processes and making the systems described here are possible. For example, instead of exchanging purchases for cellular service, a consumer can exchange purchases for Internet service, or some other service.

Another system is described next which includes a fewer number of web pages, but is able to implement a system for exchanging tracked consumer purchases for cell phone service. In particular, FIG. 8 conceptually illustrates another system for tracking and exchanging purchases for cell phone service through a website. As shown in this figure, the system 60 comprises a website 62 which is accessed by the branded cell phone 12 to perform tracking and exchange operations associated with one or more web pages 64 of the system website 62. Although the number of web pages 64 in system 60 is fewer than the number of web pages in system 50, the system 60 is fully implemented in order to perform the three required functions of any system that exchanges tracked purchases for cell phone service, the required functions being (i) capturing receipts of the consumer's purchases by scanning the encoded systems of the items purchased, (ii) verifying and validating that the sum of purchases totals to an amount that satisfies the threshold spending amount, and (iii) applying any incentive credits to the settlement bill provided to the consumer for the cell service.

III. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
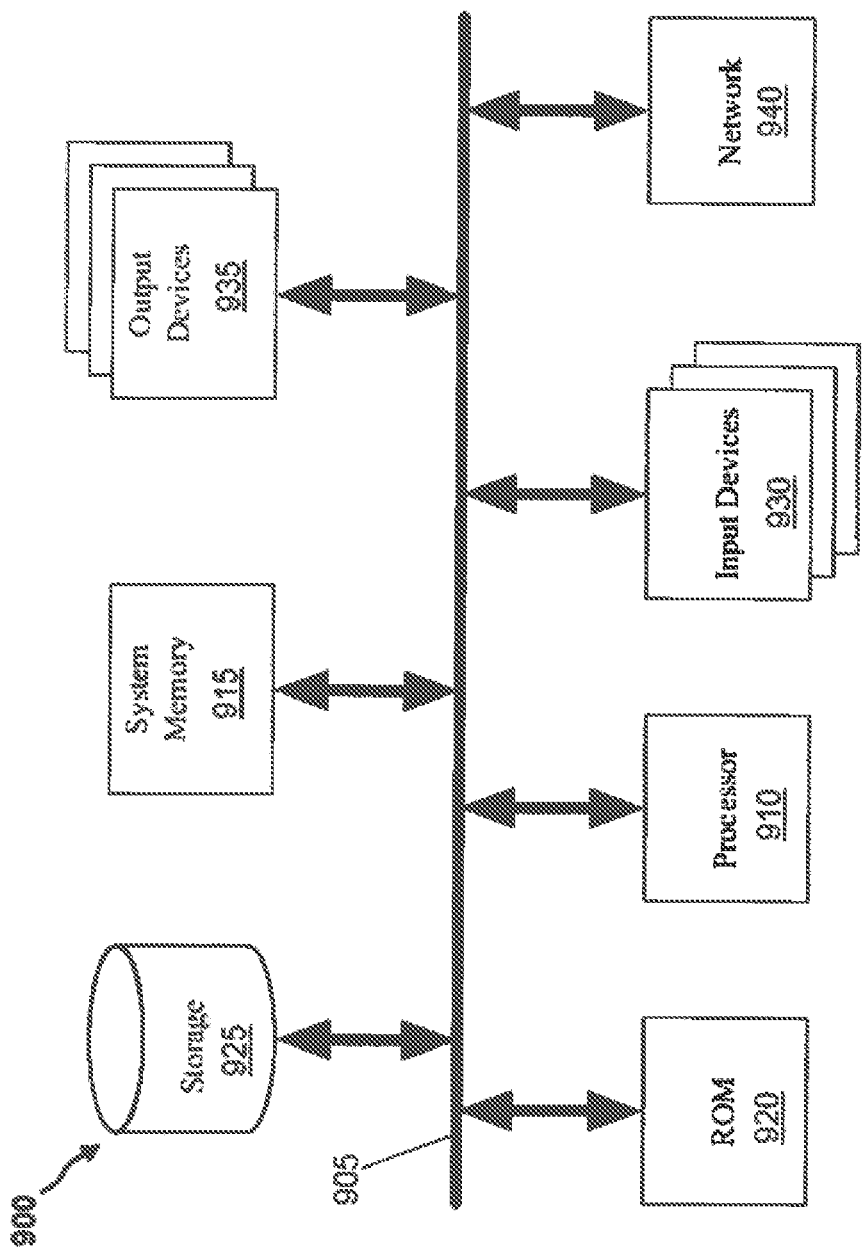
FIG. 9 conceptually conceptually illustrates an electronic system with which some embodiments of the invention are implemented.

FIG. 9 conceptually conceptually illustrates an electronic system 900 with which some embodiments of the invention are implemented. The electronic system 900 may be a computer, phone, PDA, or any other sort of electronic device. Such an electronic system includes various types of computer readable media and interfaces for various other types of computer readable media. Electronic system 900 includes a bus 905, processing unit(s) 910, a system memory 915, a read-only 920, a permanent storage device 925, input devices 930, output devices 935, and a network 940.

The bus 905 collectively represents all system, peripheral, and chipset buses that communicatively connect the numerous internal devices of the electronic system 900. For instance, the bus 905 communicatively connects the processing unit(s) 910 with the read-only 920, the system memory 915, and the permanent storage device 925.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 925.

Other embodiments use a removable storage device (such as a floppy disk or a flash drive) as the permanent storage device 925. Like the permanent storage device 925, the system memory 915 is a read-and-write memory device. However, unlike storage device 925, the system memory 915 is a volatile read-and-write memory, such as a random access memory. The system memory 915 stores some of the instructions and data that the processor needs at runtime. In some embodiments, the invention's processes are stored in the system memory 915, the permanent storage device 925, and/or the read-only 920. For example, the various memory units include instructions for processing appearance alterations of displayable characters in accordance with some embodiments. From these various memory units, the processing unit (s) 910 retrieves instructions to execute and data to process in order to execute the processes of some embodiments.

The bus 905 also connects to the input and output devices 930 and 935. The input devices enable the user to communicate information and select commands to the electronic system. The input devices 930 include alphanumeric keyboards and pointing devices (also called "cursor control devices"). The output devices 935 display images generated by the electronic system 900. The output devices 935 include printers and display devices, such as cathode ray tubes (CRT) or liquid crystal displays (LCD). Some embodiments include devices such as a touchscreen that functions as both input and output devices.

Finally, as shown in FIG. 9, bus 905 also couples electronic system 900 to a network 940 through a network adapter (not shown). In this manner, the computer can be a part of a network of computers (such as a local area network ("LAN"), a wide area network ("WAN"), or an Intranet), or a network of networks (such as the Internet). Any or all components of electronic system 900 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

Figure 8:
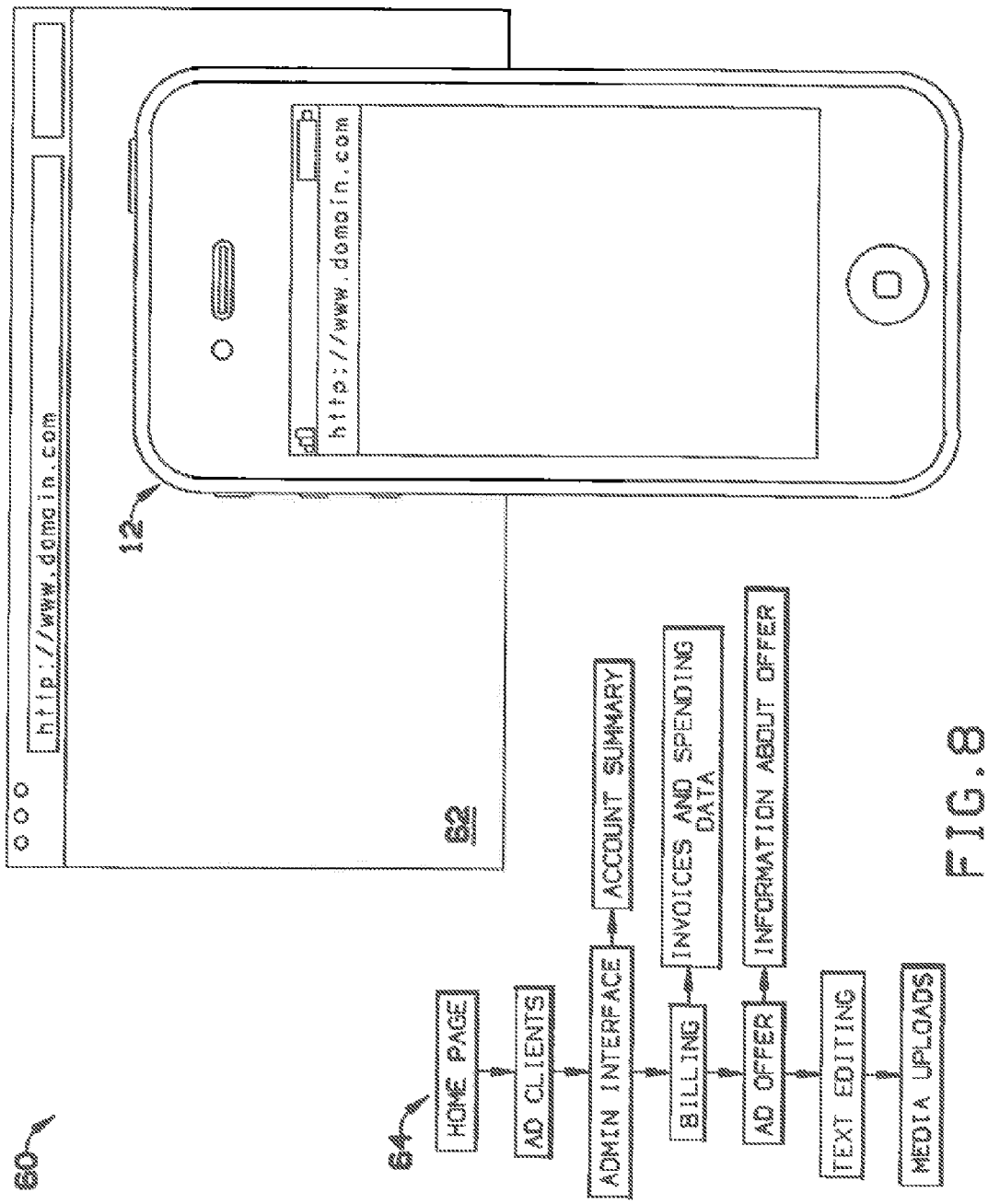
FIG. 8 conceptually illustrates another schematic view of a system in some embodiments for tracking and exchanging purchases for cell phone service through a website.

While the invention has been described with reference to numerous specific details, one of ordinary skill in the art will recognize that the invention can be embodied in other specific forms without departing from the spirit of the invention. For example, FIG. 6 conceptually illustrates a process. The specific operations of this process may not be performed in the exact order shown and described. Specific operations may not be performed in one continuous series of operations, and different specific operations may be performed in different embodiments. Furthermore, the processes could be implemented using several sub-processes, or as part of larger macro processes. Also, FIGS. 7 and 8 illustrate example schematics of systems for exchanging tracked purchases for free or reduced-price cellular phone service. The specific operational units associated with each of these schematics may not be organized in the respective system with exactly the same operational and functional relationships to other operational units. For instance, in order not to obscure the schematic shown in FIG. 8 with unnecessary detail, certain system functional and/or operational units have not been illustrated, including, for example, any communication and network management modules, administrative modules, database management systems, web servers, and a variety of other such functional units. Thus, one of ordinary skill in the art would understand that the invention is not to be limited by the foregoing illustrative details and examples, but rather is to be defined by the appended claims.

I claim:

1. A non-transitory computer readable medium storing a program which when executed by at least one processing unit of a computing device exchanges tracked purchases for cell phone service, said program comprising sets of instructions for:
   receiving a set of consumer registration selections to establish a preferred cell phone communication service plan on a vendor-branded cellular communication device that is provided to a consumer by a cell phone communication service provider, the set of consumer registration selections comprising a selection of the cell phone communication service provider, a selection of a set of coop vendors, and a selection of the preferred cell phone communication service plan;
   receiving, within a defined period of time, a set of scanned encoded symbols, each scanned encoded symbol associated with a transactional monetary amount paid by the consumer to purchase a product associated with at least one coop vendor in the set of coop vendors;
   calculating a total monetary amount paid by the consumer during the defined period of time based on a sum of the transactional monetary amounts associated with the set of scanned encoded symbols received within the defined period of time;
   determining whether the total monetary amount paid by the consumer during the defined period of time satisfies a threshold amount of spending required to obtain a preferred pricing credit for the preferred cell phone communication service plan during the defined period of time;
   applying the preferred pricing credit to a settlement bill associated with the preferred cell phone communication service plan when the total monetary amount paid by the consumer during the defined period of time satisfies the threshold amount of spending; and
   providing the settlement bill to the consumer.

2. The non-transitory computer readable medium of claim 1, wherein the preferred pricing credit comprises a entire reduction of the settlement bill when the total monetary amount paid by the consumer during the defined period of time satisfies the threshold amount of spending.

3. The non-transitory computer readable medium of claim 1, wherein the preferred pricing credit comprises a partial reduction of the settlement bill when the total monetary amount paid by the consumer during the defined period of time satisfies the threshold amount of spending.

4. The non-transitory computer readable medium of claim 1, wherein each encoded symbol is one of a bar code and a quick response (QR) code.

5. The non-transitory computer readable medium of claim 1, wherein each encoded symbol is scanned by a scanning device of a retailer from which the consumer makes each purchase of a product associated with at least one coop vendor in the set of coop vendors.

6. The non-transitory computer readable medium of claim 1, wherein the preferred cell phone communication service plan corresponds to a set of service level parameters that define the scope of the preferred cell phone service plan.

7. The non-transitory computer readable medium of claim 6, wherein the set of service level parameters comprises the threshold amount of spending, an amount of the preferred pricing credit, and the vendor-branded cellular communication device.

8. The non-transitory computer readable medium of claim 1, wherein the program further comprises a set of instructions for providing, to the vendor-branded cellular communication device, a set of coupons associated with at least one coop vendor in the set of coop vendors.

9. The non-transitory computer readable medium of claim 8, wherein each coupon in the set of coupons comprises an encoded coupon symbol that is associated with a product and when scanned offsets the transactional monetary amount paid by the consumer to purchase the product.

10. The non-transitory computer readable medium of claim 8, wherein the set of coupons comprise at least one coupon associated with the cell phone communication service provider.

11. The non-transitory computer readable medium of claim 1, wherein the defined period of time comprises a billing cycle associated with the preferred cell phone communication service plan.

* * * * *